May 23, 1967  E. R. SEWELIN  3,321,236
MOTOR VEHICLE BODY MOUNTING MEANS
Filed Dec. 10, 1964  5 Sheets-Sheet 1
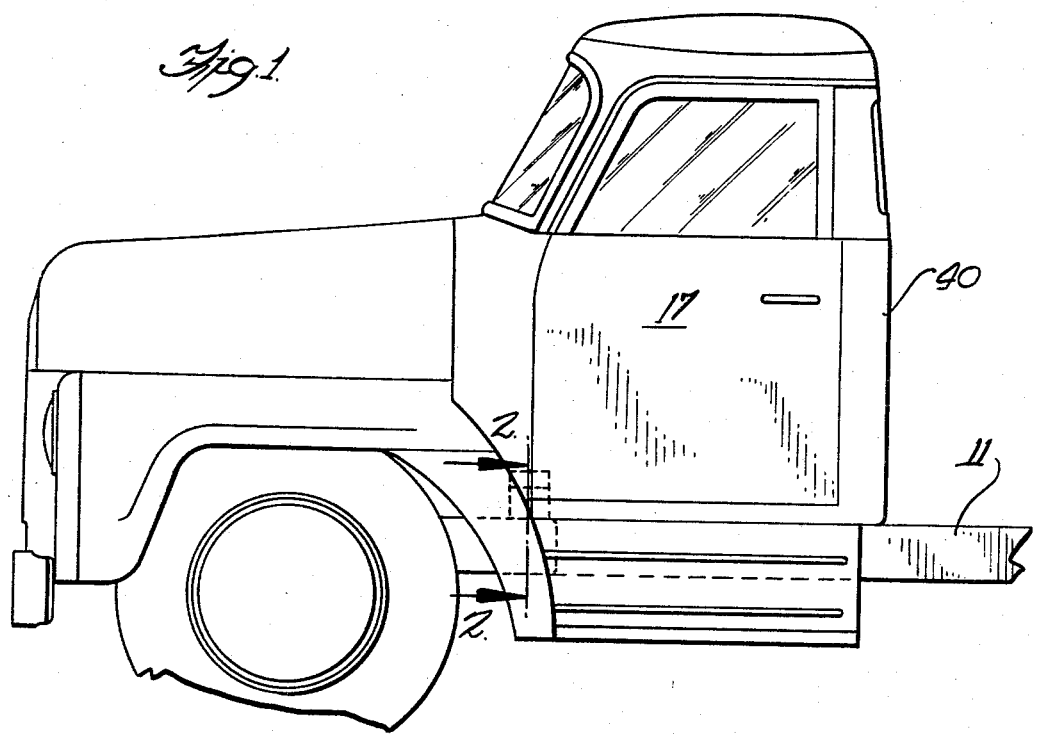
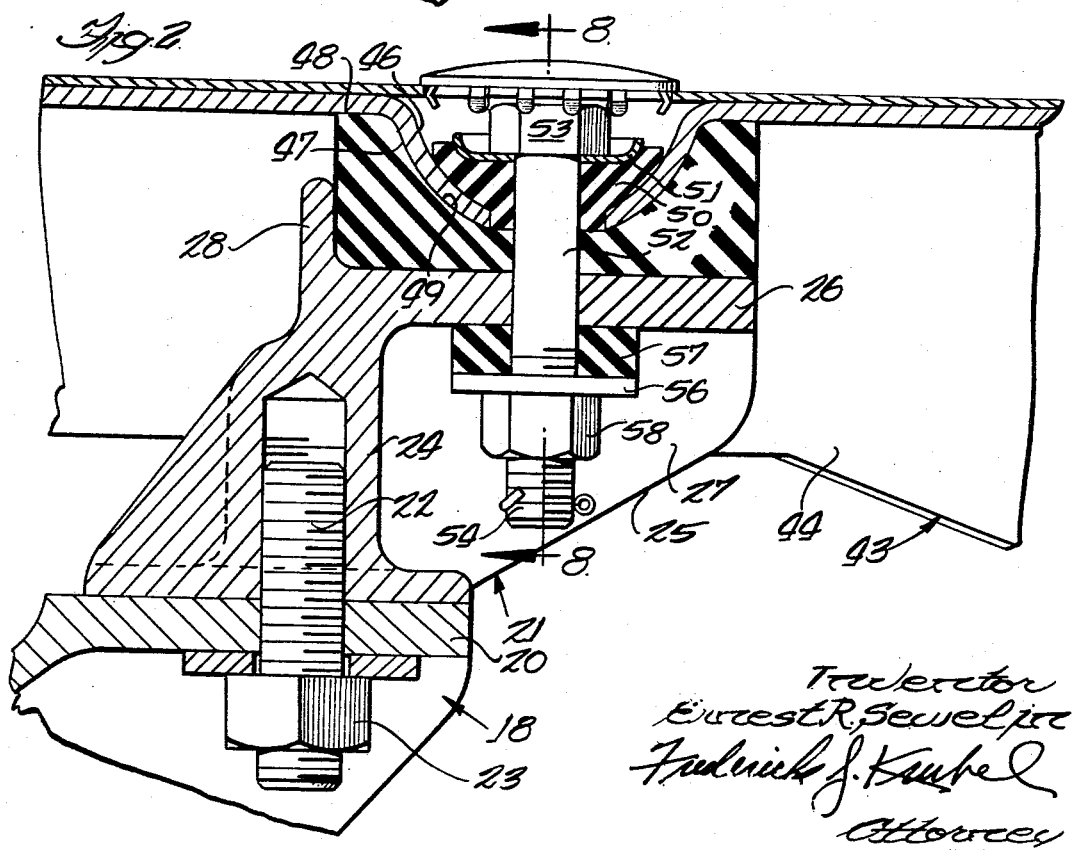
Inventor
Ernest R. Sewelin
Frederick J. Kaubel
Attorney May 23, 1967  E. R. SEWELIN  3,321,236
MOTOR VEHICLE BODY MOUNTING MEANS
Filed Dec. 10, 1964  5 Sheets-Sheet 2
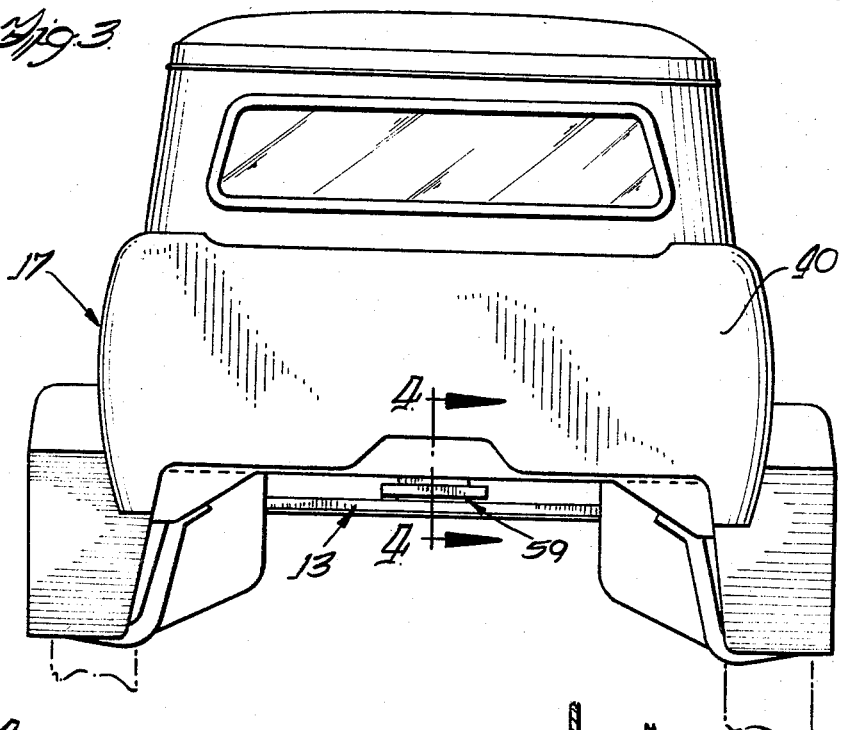
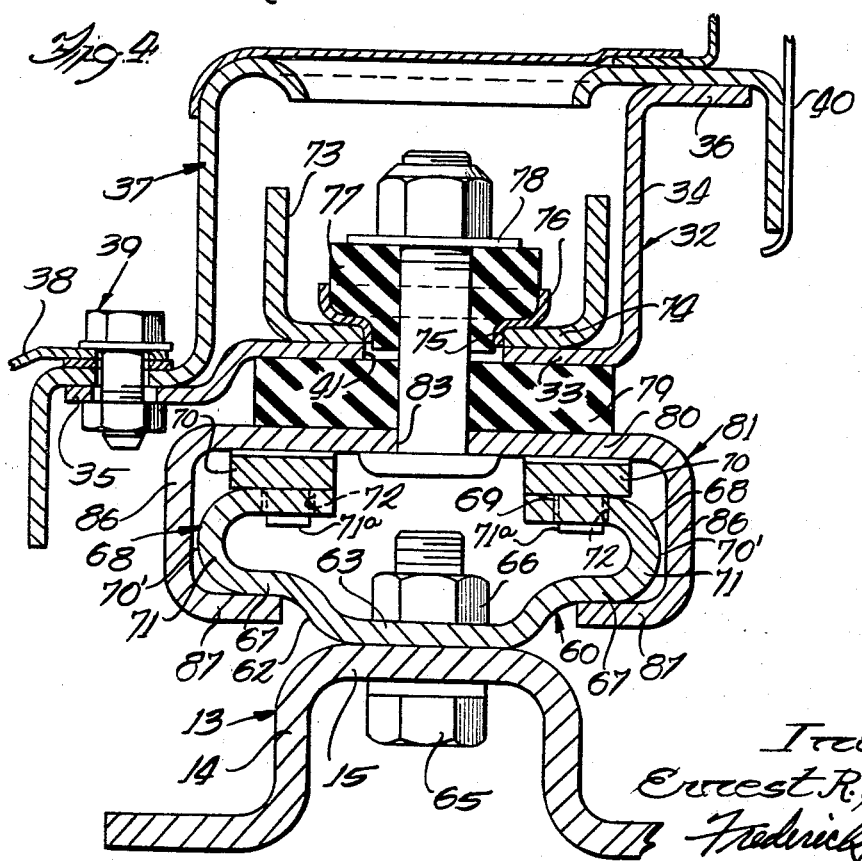
Inventor
Ernest R. Sewelin
Frederick J. Kinkel
Attorney May 23, 1967 E. R. SEWELIN 3,321,236
MOTOR VEHICLE BODY MOUNTING MEANS
Filed Dec. 10, 1964 5 Sheets-Sheet 3

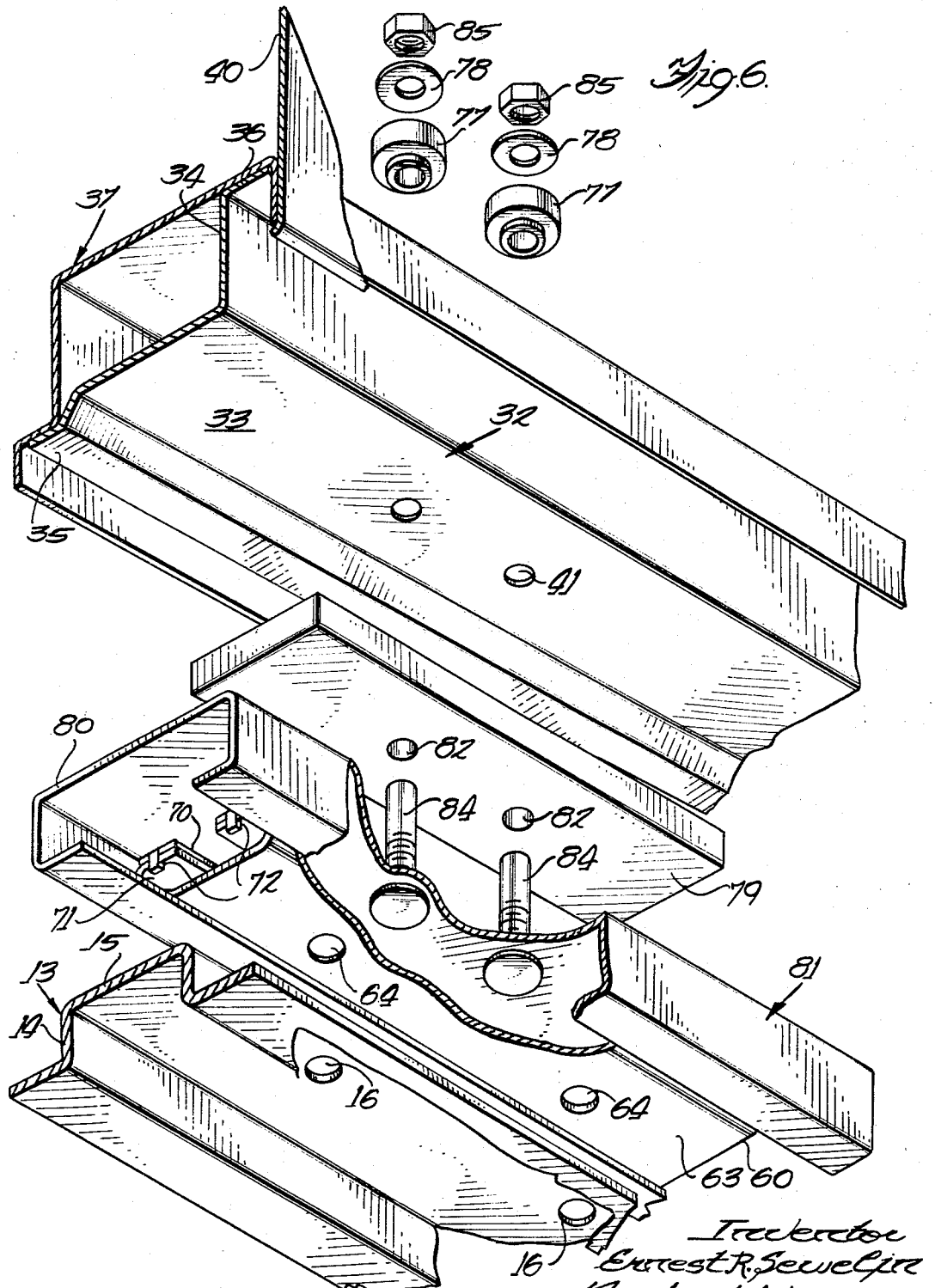

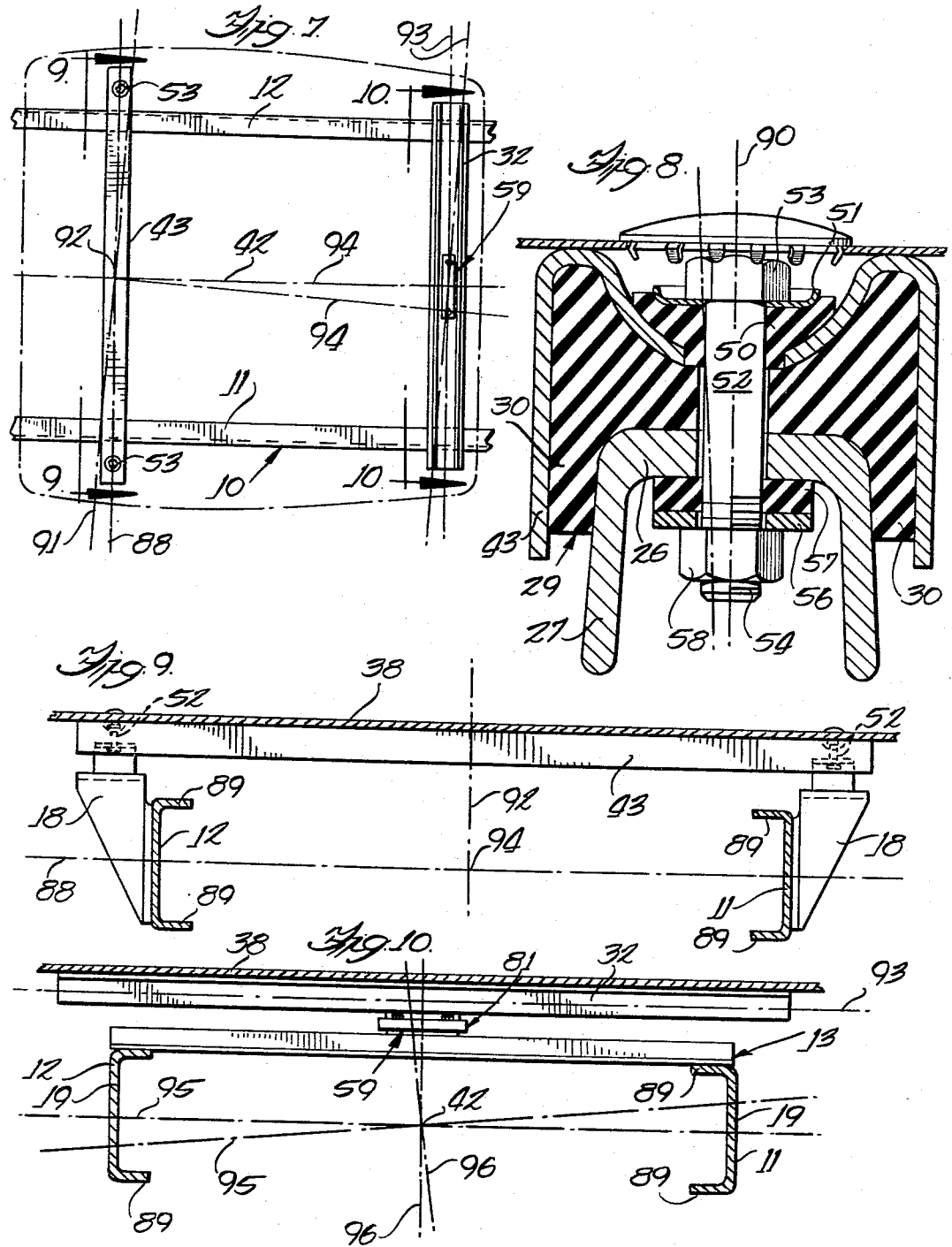

United States Patent Office 3,321,236
Patented May 23, 1967

3,321,236
MOTOR VEHICLE BODY MOUNTING MEANS
Ernest R. Sewelin, Waterloo, Ind., assignor to International Harvester Company, a corporation of Delaware
Filed Dec. 10, 1964, Ser. No. 417,418
5 Claims. (Cl. 296—35)

This invention relates to motor vehicle body mounting means and more particularly to a new and improved three-point mounting system for motor truck cabs.

In the operation of trucks or other vehicles designed for carrying heavy loads over an uneven terrain or road surface or other road surface irregularities one or more ground-engaging wheels are elevated differently from the other wheels causing the frame side sill members to twist or weave. Hence, it is customary in present day truck design construction to provide a chassis frame which is relatively flexible and capable of relieving the torsional forces imposed on the chassis frame by the distortion of the frame side sill members. While automotive engineers have effectively mitigated the damaging influence of these forces on the chassis frame by providing a flexible frame, the problem of mounting the vehicle cab on the flexible frame in such a manner so as to minimize the transfer of the destruction forces to the operator's compartment or cab has not been entirely solved. It is, therefore, the primary objective of the primary invention to provide a novel truck cab mounting structure which allows a limited relative movement between the cab and the chassis frame whereby the distorting forces and shocks to which the chassis frame is subjected are transmitted to a lesser degree to the truck cab than heretofore experienced in prior motor vehicles.

Another object is the provision of a novel three-point mounting system for motor truck cabs whereby the cab is capable of moving relatively to the chassis frame in a controlled manner to accommodate distortion of the side sill frame members.

Still another object is the provision of a novel mounting structure for operatively interconnecting the rear portion of the vehicle cab and the chassis frame whereby the rear portion of the vehicle cab is capable of moving transversely with respect to the longitudinal median line of the frame.

A still further object is the provision of a unique motor truck cab mounting structure which functions to isolate the vehicle cab from the distorting forces and vibrations to which the chassis frame is subjected and to prevent distortion of the motor truck cab when the chassis frame upon which it is mounted is subjected to periodic torsional forces.

The foregoing and other important objects and desirable features inherent in and encompassed by the invention, together with many of the purposes and uses thereof, will become readily apparent from a reading of the ensuing description in connection with the annexed drawings, in which:

FIGURE 1 is a side elevational view of the forward-most portion of a motor truck embodying the invention;

FIGURE 2 is a vertical sectional view taken substantially along line 2—2 of FIGURE 1;

FIGURE 3 is a rear elevational view of the vehicle cab illustrated in FIGURE 1;

FIGURE 4 is a vertical sectional view taken substantially along line 4—4 of FIGURE 3;

FIGURE 6 is a perspective view similar to FIGURE 5 illustrating the vehicle cab rear mounting structure;

FIGURE 7 is a plan view of the forward portion of the truck chassis frame; the outline of the operator's compartment or cab is shown in broken lines;

FIGURE 8 is a sectional view taken substantially along line 8—8 of FIGURE 2;

FIGURE 9 is a sectional view taken substantially along line 9—9 of FIGURE 7; and FIGURE 10 is a sectional view taken substantially along line 10—10 of FIGURE 7.

Figure 5:
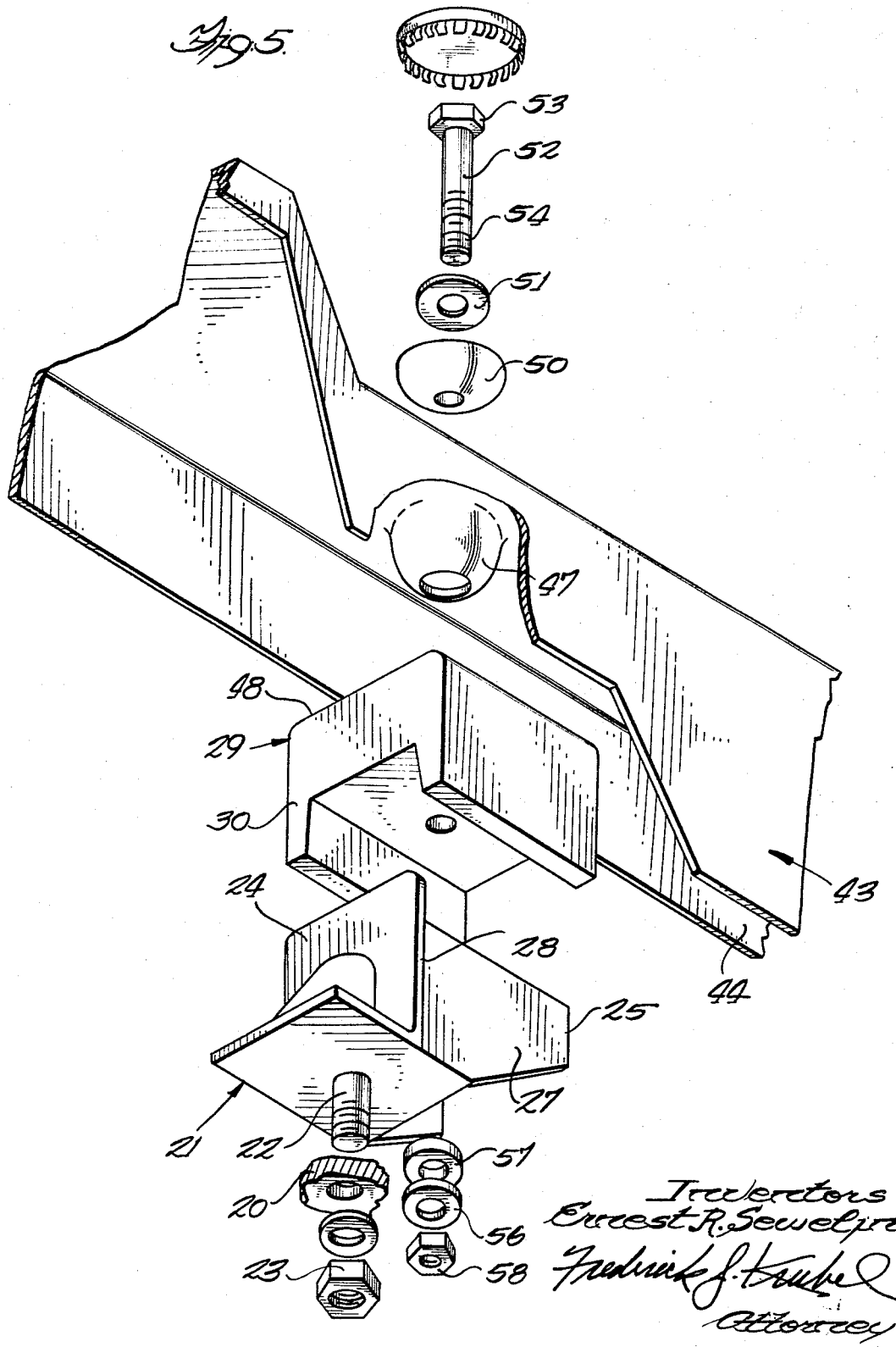
FIGURE 5 is an enlarged exploded perspective view of the mounting structure for interconnecting a forward portion of the motor truck cab to the chassis frame.

Referring to the drawings in detail, wherein like reference characters represent like elements throughout the various views, the forward end portion of a truck chassis, frame 10 is shown. The chassis frame 10 includes a pair of longitudinally extending, transversely spaced side sill members 11 and 12 having a conventional U-shaped form. The side sill members 11 and 12 are interconnected by a plurality of longitudinally spaced, transversely disposed frame cross members 13 (only one of which is shown in the drawings). As best shown in FIGURES 4 and 6 the cross member 13 is partially defined by a substantially inverted U-shaped section 14. The web portion 15 of the U-shaped section is provided with a pair of transversely spaced and aligned apertures 16, each aperture 16 is closely spaced adjacent to and is disposed on the respective opposite side of a vertical plane containing longitudinal median line of the frame 10.

The forward portion of the vehicle cab or operator's compartment, designated generally by numeral 17, is connected to the chassis frame 10 at two points which are transversely spaced and in transverse alignment and are also longitudinally spaced from the rear cab connection to be described hereinafter. Both front connecting structures are structurally and functionally the same and, therefore, only the structure on one side of the chassis frame 10 will be described in detail. The front connecting structure positioned alongside sill member 11 includes a bracket 18 which extends outwardly and upwardly from the web 19 of the side member 11 to which it is rigidly fastened. The bracket 18 has an integrally formed and substantially horizontally disposed platform 20, which is vertically spaced above the side sill member 11. The lower end of a bracket 21 abuts the platform 20 and is suitably secured thereto by means of a threaded rod 22 and cooperating nut 23. The bracket 21 is formed to provide a vertically disposed plate-like portion 24. The bracket 21 also has a substantially inverted U-shaped portion 25 which is integrally formed with and extends outwardly from the plate-like portion 24. Referring to FIGURE 2, it will be noted that the bight 26 of the U-shaped portion 25 is substantially flat and horizontally disposed and is vertically spaced below the uppermost edge of the plate-like portion 24. In a similar manner the legs 27 of the U-shaped portion 25 are spaced a smaller distance with respect to each other than the space between the vertical side edges of the plate-like portion 24. As a result, a U-shaped flange 28 is provided which defines the innermost end of the U-shaped portion 25. It is also to be understood that the legs 27 of the U-shaped portion 25 diverge slightly with respect to each other as they extend from the bight 26 as best illustrated in FIGURE 8.

The U-shaped portion 25 serves as a support for an insulator 29 made of rubber or rubber-like material which is adapted to rest upon the bight 26 of the U-shaped portion 25. The insulator 29 is formed wth a pair of legs 30 which partially embrace and abut the exterior of the legs 27 of the U-shaped portion 25. One end face of the insulator 29 firmly abuts the U-shaped flange 28 which flange 28 serves to correctly position and maintain the insulator 29 on the U-shaped portion 25. As clearly illustrated in FIGURES 5 and 10, the interior surfaces of the legs 30 are inclined with respect to the flat, underside surface of the insulator 29 that abuts the bight 26 in the same manner that the legs 27 are inclined with respect to the bight 26. Consequently, when each insulator 29 is assembled on its respective U-shaped portion 25, the interior surfaces thereof lie flat against corresponding surfaces of the respective U-shaped portion 25.

The outline of the sheet metal portion of the vehicle cab 17 is shown in broken lines in FIGURE 7. The vehicle cab 17 includes a transversely extending substantially L-shaped rear cross member or sill 32, the legs 33 and 34 of which are provided with horizontally oppositely projecting flanges 35, 36, respectively, for attachment to the rear cross sill reinforcement 37, as shown in FIGURE 4. The floor panel 38, partially shown in FIGURE 4, is attached to the cab rear cross member 37 by means of a plurality of pairs of attaching bolts and nuts, designated by numeral 39 (only one pair of which is illustrated in FIGURE 4). A cab body or outer back panel 40 is also connected to the rear cross sill reinforcement 37. From the foregoing, it will be appreciated that the cab rear cross member 32 and the cross sill reinforcement 37 form a box-like structure which extends transversely of the chassis frame 10 and strengthens and rigidifies the vehicle cab 17. As best shown in FIGURE 6, the leg 33 of the cab rear cross member 32 has a pair of apertures 41 formed therethrough. The apertures 41 are formed through the mid-section of the cab rear cross member 32 and are spaced on respective opposite sides of a vertical plane containing the longitudinal neutral axis or line 42 of the chassis frame 10.

A front cab cross member 43, which is arranged substantially parallel to and longitudinally spaced from the rear cab cross member 32, is rigidly fastened to the underside of the floor panel 38 by any suitable means. The front cab cross member 43 has a generally inverted U-shaped configuration and the legs 44 thereof extend downwardly from the web 45 thereof. As best shown in FIGURES 2, 5 and 8 the web 45 is formed with a cup-shaped depression which is defined on its uppermost side by a generally semi-spherical, concave surface 46 and on its underside by a generally semi-spherical convex surface 47. While the depression on only one end of the cab cross member 43 is illustrated in FIGURE 2 it is to be understood that a second depression is provided at the opposite end of the cab cross member 43. An end section of the front cab cross member 43 is adapted to seat itself on the insulator 29 with the legs 44 thereof embracing the outer surfaces of the insulator legs 30. The uppermost surface 48 of the insulator 29 is provided with a cup-shaped depression which conforms to the convex surface 47 for receiving a respective one of the two depressions formed in the end sections of the front cab cross member 43. The convex surface 47 of the depression is seated upon the generally semi-spherical surface 49 defining the insulator depression and a rubber or rubber-like rebound insulator 50, in turn, is seated upon the upwardly facing, concave surface 46 of the web 45 of the front cab cross member 43. A cup-shaped insulator retainer 51 is adapted to be centered and seated upon the rebound insulator 50. The retainer 51, rebound insulator 50, front cab cross member web 45, insulator 29 and bight 26 of the U-shaped portion 25 are provided with vertically aligned openings therethrough. A bolt 52 extends through the aligned openings and has an enlarged head 53 adapted to abut the insulator retainer 51 and to have a threaded end portion 54 disposed below the lowermost surface 55 of the bight 26. A compression washer 56 on the threaded end portion 54 engages a pad or disk 57 of rubber or rubber-like material also mounted on the threaded end portion 54 and interposed between the compression washer 56 and the downwardly facing surface 55 of the bight 26. A retaining nut 58 is engageable with the threaded end portion 54 to firmly clamp the front cab cross member 43 to a respective U-shaped portion 25 and to maintain the vehicle cab front connection structure described above in its assembled relationship. From the foregoing, it will be appreciated that metal-to-metal contact between the mating parts is effectively prevented by the rebound insulator 50, insulator 29, and the pad 57. From the foregoing, it will also be appreciated that limited movement of the cab front cross member 43 toward the side sill members 11 and 12 is permitted but such vertical movement is yieldably resisted by the deformable rubber insulator 29. In a like manner the rebound insulators 50 and the pads 57 cushion movement of the front cab cross member 43 away from the side sill members 11 and 12 Not only do the front mounting connections permit the body structure or vehicle cab 17 to move vertically with respect to the chassis frame 10 but also to pivot about a vertically extending axis contained in a laterally extending vertical plane passing through the longitudinal axes of the bolts 52 and a longitudinally extending vertical plane containing the longitudinal median line of the chassis frame 10 by deformation of the legs 30 of the insulator 29. By constructing the front mounting connections as specifically described above the possibility of metal-to-metal contact between the body structure 17 and chassis frame 10 is eliminated. It will also be appreciated that the resilient material interposed between the body and frame parts reduces the transfer of vibration and noise to the body structure. The operation of the connections between the forward portion of the vehicle cab 17 and the chassis frame 10 will be described in detail hereinafter.

The rearwardmost end of the vehicle body structure or cab 17 is connected to the chassis frame 10 by means of a single cab mounting structure, designated generally by numeral 59. The rear cab mounting structure 59 includes a guide or track element 60 rigidly carried by the chassis frame 10 and a cooperable retainer assembly, designated generally by numeral 81, which is operably connected to the rear portion of the vehicle cab 17. As best illustrated in FIGURES 4 and 6, the guide element 60 includes a substantially U-shaped portion 62, the web 63 of which is provided with a pair of spaced apertures 64 therethrough which are alignable with the apertures 16 formed in the rear cross member 13. The guide element 60 is rigidly fastened to the frame cross member 13 by means of a pair of bolts 65, the shank portion of each being adapted to extend through a respective pair of aligned apertures 16, 64. Suitable lock nuts 66 are threadable on the bolts 65 to maintain to the guide element 60 rigidly fastened to the frame cross member 13. When fastened on the uppermost side of the web 15 of the frame cross member 13, the longitudinal axis of the guide element 60 extends substantially perpendicular to the longitudinal axis or neutral axis 42 of the chassis frame 10 and is contained substantially within a horizontally disposed plane. Projecting substantially horizontally outwardly from the free end of each leg of the U-shaped portion 62 is an integrally formed flange 67. The guide element 60 is formed to also include a pair of substantially J-shaped portions 68 each of which is integrally formed with a respective flange 67 whereby straight leg 69 thereof is vertically spaced above and substantially parallel to such respective flange 67. The outermost surfaces 70 of the curved sections 71 of the J-shaped portions 68 define the extremities of the guide element 60 measured in a longitudinal direction with respect to the chassis frame 10. A bowed leaf spring 70 is mounted upon each of the straight legs 69. Each leaf spring 70 has a downwardly turned tab 71a formed on each end thereof which is adapted to extend into a respective one of a pair of notches 72 formed in opposite end edges of each leg 69. From the foregoing, it will be appreciated that the leaf springs 70 are maintained on the straight legs 69 of the guide element 60 by the connections provided by the tabs 71a and notches 72. The purpose of the leaf springs 70 will be pointed out hereinafter. Mounted upon and suitably secured to the horizontally disposed leg 33 of the rear cab cross member 32 is a substantially U-shaped reinforcement member 73. The web 74 of the reinforcement member 73 is provided with a pair of transversely spaced apertures 75 therethrough, each of which is registerable with a respective one of the apertures 41 formed through the leg 33. A pair of cup-shaped bushing retainers 76 are seated upon the uppermost surface of the web 74 of the reinforcement member 73 and each bushing retainer 76 is provided with a downwardly projecting annular flange which engages the surface of the web 74 defining a respective aperture 75. A rubber or rubber-like bushing 77 is seated upon each retainer 76. A compression washer 78 engages the uppermost surface of each bushing 77. The rubber or rubber-like insulator 79 in the form of a block or layer is interposed between the underside of the rear cab cross member leg 33 and the uppermost side of the web portion 80 of a substantially inverted U-shaped retainer member, designated generally by numeral 81. Each compression washer 78 and the bushing 77 associated therewith are provided with vertically aligned openings which are registerable with a respective aperture 41 formed through the leg 33 and a respective one of a pair of associated apertures 82, 83 formed respectively through the insulator 79 and web portion 80 of the retainer member 81. A pair of vertical bolts 84 are provided, each of which extends through a respective set of vertically aligned apertures 41, 82, 83 and a respective one of the washers 78 and bushings 77. Each vertical bolt 84 is threadingly engaged by a lock nut 85 for firmly clamping the assembled parts together. From the foregoing, it will be appreciated that limited vertical movement of the retainer member 81 toward the rear cab cross member 32 is permitted but such vertical movement is yieldably resisted by the deformable rubber insulator 79. In a like manner, the rubber bushing 77 cushions rebound or vertical movement of the rear cab cross member 32 away from the retainer member 81.

As best illustrated in FIGURE 4, the retainer member 81 and guide element 60 are operatively connected together for relative sliding movement generally along an axis perpendicular to a vertical longitudinally extending plane containing the longitudinal median line of the chassis frame 10. The interconnection of the retainer member 81 and the guide or track element 60 is partially accomplished by spacing the depending legs 86 of the retainer member 81 in such a manner that the innermost side surface of each is closely adjacent to the outermost surface 70 of a respective curved section 71 of the guide element 60. Thus, relative longitudinal movement of the guide element 60 with respect to the retainer member 81 is substantially prevented. Integrally formed with the retainer member legs 86 are inwardly directed flanges 87, the uppermost surface of each being adapted to slidingly engage a respective flange 67 of the guide element 60 when the guide element 60 and retainer member 81 are assembled together. It will also be noted that when the guide element 60 and retainer member 81 are assembled together the bowed leaf springs 70 which are carried by the straight legs 69 frictionally engage the under surface of the web portion 80 of the retainer member 81. It is to be understood that the vertical distance between the straight legs 69 and the web portion 80 when the flanges 87 are in abutting engagement with the guide element flanges 67 is less than the vertical distance between the center portion of each leaf spring 70 and its respective ends when the leaf spring is in its free or uncompressed state. Consequently, when the guide element 60, retainer member 81 and bowed leaf springs 70 are assembled, as illustrated in FIGURE 4, the leaf springs 70 are tensioned and yieldably urge the retainer member flanges 87 vertically into firm abutting engagement with the guide element flanges 67. Thus, the connection between the retainer member 81 and the guide element 60 described above permits the connected components to slide relatively to each other only in a transverse direction with respect to the neutral axis, designated by reference character 42, of the chassis frame 10. The tensioned leaf springs 70 prevent any undue vertical play or looseness between the guide element 60 and the retainer member 81 and, thus, serve to eliminate rattling of the connected components. It will also be appreciated that the leaf springs 70 function as cushioning means for the vehicle cab 17 in conjunction with the resilient action of the insulator 79.

From the foregoing, it will be appreciated that vertical movement of the vehicle cab 17 with respect to the chassis frame 10 is effectively cushioned at each of the three points of connection of the vehicle cab 17 to the chassis frame 10. By constructing the mounting connections as specifically described above the possibility of metal-to-metal contact between the body structure and the frame 10 is eliminated. It will also be appreciated that the resilient material interposed between the body and frame parts reduces the transfer of vibration and noise to the body structure or vehicle cab 10. Furthermore, by arranging the mounting connections as pointed out hereinbefore, the vehicle cab 10 as a whole is capable of moving relatively with respect to the chassis frame 10 in a manner as will be pointed out hereinafter whereby any flexing or twisting of the chassis frame 10 imposes very little strain on the vehicle cab 17.

In normal operation of the motor truck over a comparatively smooth road bed, the chassis frame twist is practically non-existent. The entire weight of the vehicle cab 17 is supported by the guide element 60 at the rear through the intermediary of the rubber cushioning pad or insulator 79 and the bowed leaf springs 70 and at the forward end by the transversely spaced and aligned brackets 18 through the intermediary of the insulators 29. Movement of the vehicle cab 17 vertically away from the chassis frame 10 is yieldably resisted by the rubber bushing 77 at the rear of the vehicle cab 17 and by the rebound insulators 50 at the forward end of the vehicle cab 17. The vehicle cab 17 is maintained in a relatively fixed upright position with respect to the chassis frame 10 by the three mounting structures and is properly centered with respect thereto so that longitudinal median line 94 of the vehicle cab lies substantially in the same vertical plane containing the neutral axis 42 of the chassis frame 10. Twisting of the chassis frame 10, wherein one end of the chassis frame side sill members 11, 12 is raised with respect to the other side sill member, is effectively accommodated without imposing severe damaging strains on the sheet metal parts of the vehicle cab structure 17. As an example, if the forward end of the side sill member 11 is suddenly displaced vertically downwardly and simultaneously the forward end of the side sill member 12 is displaced vertically upwardly, the resulting forces are not transmitted to the vehicle cab structure 17 to torsionally distort the same. When this occurs, the side sill members 11 and 12, in effect, pivot in opposite directions in vertical planes about a transversely extending axis 88 disposed in a vertical plane containing the bolts 52 and spaced midway between the upper and lower flanges 89 of the side sill members 11, 12. Inasmuch as the forward end of the vehicle cab 17 is connected to each side sill member 11 and 12 in a substantially relatively immovable manner (except for the movement permitted by deformation of the insulators 29 and 50), the forward end of the cab 17 is constrained to move substantially in unison with the chassis side sill members 11, 12. The transversely extending axis or line 88 is also perpendicular to the neutral axis 42 of the chassis frame 10 as shown in the drawing. Because of the vertical spacing of the bolts 52 from the transverse axis 88 such pivotal movement of the side sill members 11, 12 causes the longitudinal axis 90 of the bolt 52, associated with the side sill member 11, which bolt 52 is normally vertically disposed when the vehicle is traversing a level and smooth road bed, to assume the inclined broken line position shown in FIGURE 8. The longitudinal axis 90 of the other bolt 52 associated with the side sill member 12 is angulated in the opposite direction such that a line extending through the centers of the heads 53 of the bolts 52 would appear as shown by numeral 91 in FIGURE 7. The line 91 represents the position of the longitudinal axis of the front cab cross member 43 in plan when the side sill members 11, 12 pivot about the transverse axis 88. The relative movement of the sections of the cab cross member 43 disposed about the U-shaped portions 25 is accommodated by deformation of the insulators 29. Thus, it will be appreciated that the rear cab cross member 32 must swing about a vertical axis 92 with respect to the chassis frame 10, which axis 92 is perpendicular to and intersects the transverse axis 88 and the neutral axis 42 of the chassis frame 10, substantially the same angular amount as the front cab cross member 43 to avoid imposing severe stresses on the vehicle cab sheet metal structure interconnecting the cab cross members 32 and 43. The longitudinal axis of the rear cab cross member 32, which normally extends transversely of the chassis frame 10, is designated by numeral 93 and during twisting of the chassis frame 10 in the aforesaid manner it assumes the dotted line position shown in FIGURE 7. Such relative movement of the rear cab cross member 32 with respect to the chassis frame 10 is accommodated by relative sliding movement of the guide element 60 with respect to the retainer member 81. It is to be understood that amount of relative movement actually occurring is exaggerated in the drawings to better illustrate the operation.

Theoretically the retainer member 81 moves in an arc with respect to the guide element 60 or, stated in another way, the guide element 60 moves in an arc with respect to the retainer member 81, if the vehicle cab 17 is assumed to be stationary with respect to the chassis frame 10, as the chassis frame 10 is being subjected to twisting forces. However, such relative arcuate movement is, as a practical matter, substantially along a horizontally disposed, transversely extending axis because of the relatively large radius of curvature of the arc (the distance between the instantaneous pivotal axis 92 and the longitudinal axis 93 of the rear cab cross member 32) in relation to the small angular movement the longitudinal median line 94 of the vehicle cab 17 actually moves with respect to the neutral axis 42 of the chassis frame 10. In other words, the fore-and-aft component of the greatest arcuate movement ever experienced in normal operation of the motor truck between the vehicle cab 17 and the chassis frame 10 in the vicinity of the rear mounting connection is extremely small so as to be negligible in comparison with the transverse side-to-side component of the actual relative movement or displacement of the vehicle cab 17 with respect to the chassis frame 10. Furthermore, it is to be understood that while the sliding connection afforded by the guide element 60 and retainer member 81 is primarily concerned with the restricting of any relative movement between the rear portion of the vehicle cab 17 to transverse movement, because of the existing slight looseness between the guide element 60 and the retainer member 81 due to manufacturing tolerances and since the retainer member 81 is capable of moving angularly slightly with respect to the cab rear cross member 32 because of the somewhat resilient manner in which the retainer member 81 is attached to the cab rear cross member 32, the fore and aft component of the greatest arcuate movement ever experienced in normal operation of the motor truck between the vehicle cab 17 and the chassis frame 10 is accommodated. It will be appreciated that the novel cab connection means described above permit the maintenance of the parallel relationship between the cab cross members 43 and 32 regardless of the shocks and strains imposed upon the chassis frame 10 and as a result the sheet metal parts of the cab attached to and interconnecting the cab cross members are not subjected to damaging stresses and strains.

When the side sill members 11 and 12 pivot about axis 88 as described above, the section of the side sill member 11 in the vicinity of the rear cab cross member 32 is displaced vertically upwardly and the section of the side sill member 12 in the vicinity of the rear cab cross member 32 is displaced vertically downwardly whereby a transverse line 95 disposed midway between the flanges 89 of the side sill members 11, 12 and perpendicular to and intersecting a vertical line 96 passing through the exact fore-and-aft and transverse center point of the guide element 60 assumes the dotted line position shown in FIGURE 10. Consequently, the guide element 60 is angulated in a counterclockwise direction, as viewed in FIGURE 10. The front cab cross member 43, however, while swinging or moving relatively to the chassis frame 10 in a generally horizontal plane, as pointed out above, remains substantially vertically stationary with respect to the chassis frame 10 during the aforementioned assumed pivotal or twisting movement of the side sill members 11, 12 as when the vehicle travels over uneven terrain. Thus, to avoid twisting of the vehicle cab 17 and imposing severe stresses thereto it is necessary that the rear cab cross member 32 and the front cab cross member 43 be immovable with respect to each other and it will therefore be appreciated that to maintain such vertically fixed relationship between the cab cross members 32, 43, the frame cross member 13 must be free to move with respect to the rear portion of the vehicle cab 17 while the rear portion of the vehicle cab 17 remains substantially vertically fixed. The relative vertical swinging of the frame cross member 13 with respect to the rear cab cross member 32 is accommodated by the rear cab mounting structure 59. As the frame cross member 13 swings in a counterclockwise direction, as viewed in FIG. 10, about the neutral axis 42 of the chassis frame 10 the guide element 60 which is rigidly carried by the frame cross member 13 moves through an arcuate path. The relative movement of the rear cab cross member 32 with respect to the frame cross member 13 is accommodated by relative sliding movement of the guide element 60 with respect to the retainer member 81, which relative movement is permitted because of the manner in which the parts are connected together as pointed out hereinbefore. As evidenced from viewing FIG. 10, the major component of the path of relative movement between the connected parts is in a transverse, horizontal direction and the vertical component of such path of movement is relatively small. The retainer member 81 is capable of moving angularly slightly with respect to the cab rear cross member 32 in a vertical plane by deformation of the insulator 79 and the resilient bushings 77. In this manner the small vertical component of the path of relative movement between the guide element 60 and the rear cab cross member 32 is accommodated without imposing any damaging stresses and strains to the sheet metal structure of the vehicle cab 17. From the foregoing it will be obvious that a minimum amount of road shock is transmitted to the cab structure when the vehicle cab is mounted on the chassis frame as described above since the damaging forces are effectively dissipated by permitting the vehicle cab 17 to move relatively to the chassis frame 10 in a controlled manner. Once the vehicle has passed over the road bed irregularity the vehicle cab 17 assumes its normal upright and steadied and centered position with respect to the chassis frame 10.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

What is claimed is:

1. In a motor vehicle having a longitudinal frame comprising a pair of longitudinally extending, transversely spaced side sill members and a transversely extending frame cross member interconnecting said side sill members and a vehicle body including a vehicle cab, a transversely extending cab cross member secured to the underside of the rearward end of said vehicle cab, the combination including said frame and vehicle body comprising, means for supporting said vehicle body upon said frame for controlled relative movement therebetween including single means for connecting said cab cross member to said frame cross member for relative, generally transverse movement therebetween including an elongated guide element carried by and arranged on a mid portion of said frame cross member whereby the longitudinal axis of said element extends transversely of said frame, said guide element being formed with a pair of longitudinally spaced, generally horizontally disposed flanges extending transversely of said frame, said single means for connecting said cab cross member to said frame cross member further including an elongated retainer member carried by a mid portion of said cab cross member, said retainer member being provided with a pair of longitudinally spaced, generally horizontally disposed flanges, a top surface each of said retainer member flanges engaging the lowermost surface of a respective guide element flange for relative sliding movement along the longitudinal axes of said guide element and said retainer member, said engaging surfaces of said flanges being effective to prevent relative vertical movement between said guide element and retainer member in one direction, and biasing means yieldably urging said slidably engaging surfaces of said guide element and retainer member flanges into frictional engagement with each other, said biasing means carried by one of said guide element and retainer member and slidably engaging the other of said guide element and retainer member, said biasing means reacting against said guide element and retainer member.

2. In a motor vehicle having a longitudinal frame comprising a pair of longitudinally extending, transversely spaced side sill members and a transversely extending frame cross member interconnecting said side sill member and a vehicle body including a vehicle cab, a first transversely extending cab cross member secured to the underside of the forward end of said vehicle cab, and a second transversely extending cab cross member secured to the underside of the rearward end of said vehicle cab, the combination including said frame and vehicle body comprising, means for supporting said vehicle body upon said frame for controlled relative movement therebetween including single means for connecting said second cab cross member to said frame cross member for relative, generally transverse movement therebetween including an elongated guide element rigidly secured to and arranged on a mid portion of said frame cross member whereby the longitudinal axis of said guide element extends transversely of said frame, said guide element being formed with a pair of longitudinally spaced, generally horizontally disposed flanges extending transversely of said frame, said single means for connecting said second cab cross member to said frame further including an elongated retainer member provided with a pair of longitudinally spaced, generally horizontally disposed flanges, resilient connection means between a mid portion of said second cab cross member and said retainer member, said retainer member being arranged on said second cab cross member whereby a top surface of each of the flanges thereof engages the lowermost surface of a respective guide element flange for relative sliding movement along the longitudinal axes of said guide element and said retainer member, said engaging surfaces of said flanges being effective to prevent relative vertical movement between said guide element and retainer member in one direction, and biasing means yieldably urging said slidably engaging surfaces of said guide element and retainer member flanges into frictional engagement with each other, and said means for supporting said vehicle body upon said frame further including a pair of oppositely disposed resilient connecting means arranged on respective opposite sides of said frame, said resilient connecting means being in transverse alignment and being longitudinally spaced from said single connecting means, each of said resilient connecting means operably interconnecting a respective end portion of said first cab cross member and said frame.

3. In a motor vehicle as set forth in claim 2, in which said resilient connection means between a mid portion of said second cab cross member and said retainer member includes an insulator of rubber-like material interposed and clamped between an uppermost surface portion of said retainer member and a bottom surface portion of said second cab cross member.

4. In a motor vehicle as set forth in claim 3, wherein said retainer member is formed to provide a portion having a substantially inverted U-shape in vertical section and each of said flanges thereof extend inwardly toward the other flange thereof from a respective free end of one of the vertical legs of said inverted U-shape portion, said retainer member flanges being vertically spaced from and parallel to the web of said inverted U-shape portion of said retainer member, and said biasing means yieldably urging said slidably engaging surfaces of said guide element and retainer member flanges into frictional engagement with each other includes spring means carried by said guide element and slidably engaging said web of said retainer member, said spring means reacting against said web of said retainer member and said guide element and interposed therein between.

5. In a motor vehicle having a longitudinal frame comprising a pair of longitudinally extending, transversely spaced side sill members and a transversely extending frame cross member interconnecting said side sill member and a vehicle body including a vehicle cab and a transversely extending cab cross member secured to the underside of the rearward end of said vehicle cab, the combination including said frame and vehicle body comprising, means for supporting said vehicle body upon said frame for controlled relative movement therebetween including single means for connecting said cab cross member to said frame cross member for relative, generally transverse movement therebetween including an elongated guide element rigidly secured to and arranged on a mid portion of said frame cross member whereby the longitudinal axis of said guide element extends transversely of said frame, said guide element being formed with a pair of longitudinally spaced, generally horizontally disposed flanges extending transversely of said frame, said single means for connecting said cab cross member to said frame further including an elongated retainer member provided with a pair of longitudinally spaced, generally horizontal disposed flanges, said retainer member having a substantially inverted U-shaped portion to provide a web and a pair of generally vertical legs, each of said retainer member flanges being integrally formed with the free end of a respective one of said vertical legs and extending toward the other vertical leg, said retainer member flanges being vertically spaced from and substantially parallel to said web, resilient connection means between a mid portion of said cab cross member and said web of said retainer member, said retainer member being arranged on said cab cross member whereby a top surface of each of the flanges thereof engages the lowermost surface of a respective guide element flange for relative sliding movement along the longitudinal axes of said guide element and said retainer member, said engaging surfaces of said flanges being effective to prevent relative vertical movement between said guide element and retainer member in one direction, means for restricting longitudinal sliding movement of said guide element with respect to said retainer member including said vertical legs of said retainer member, and biasing means yieldably urging said slidably engaging surfaces of said guide element and retainer member flanges into frictional engagement with each other including spring means slidably engaging said web and interposed between and reacting against said web of said retainer member and said guide element.

References Cited by the Examiner
UNITED STATES PATENTS

| | | | |
|---|---|---|---|
| 1,447,161 | 2/1923 | Walton | 296—35 |
| 2,882,090 | 4/1959 | Sewelin | 296—35 |

BENJAMIN HERSH, *Primary Examiner.*

J. A. PEKAR, *Assistant Examiner.*